2,800,955

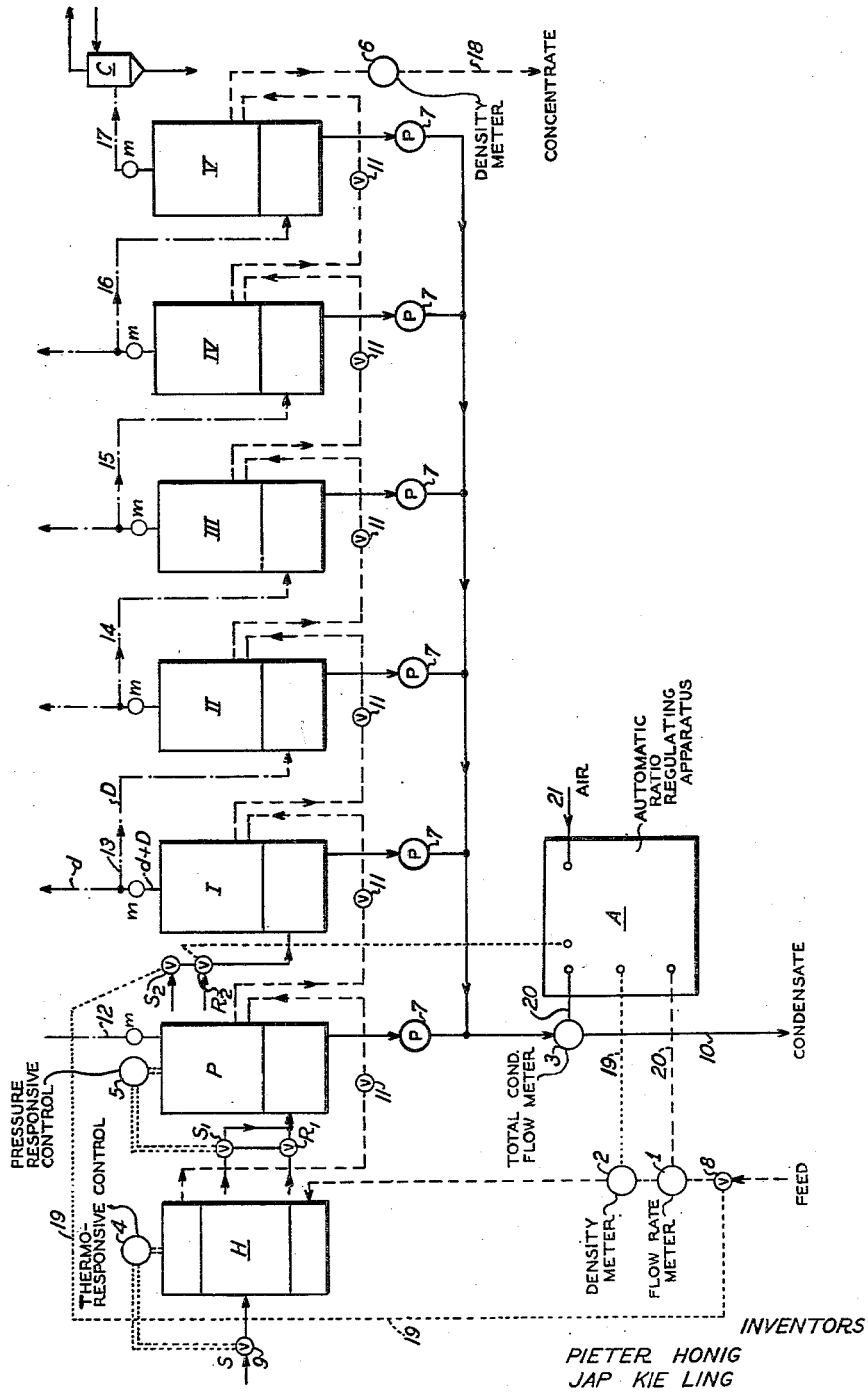

METHOD OF EVAPORATING SOLUTIONS TO OBTAIN A CONSTANT DENSITY CONCENTRATE

Pieter Honig, Elmsford, N. Y., and Jap Kie Ling, Malang, Indonesia

Application April 22, 1952, Serial No. 283,690

Claims priority, application Netherlands April 26, 1951

5 Claims. (Cl. 159—47)

The present invention relates to a method and apparatus for a manual, semi-automatic or fully automatic regulation of a simple or multiple effect evaporation, with or without removal of vapor, the apparatus including a pre-evaporator or so-called Pauly-body, for the evaporation of solutions, such as sugar-juice, fruit juice, salt-solutions, glue-solutions etc., to obtain an evaporated solution of constant density, in which the incrustation which occurs in the course of the manufacture has no influence on the quality of the regulation, but only limits the evaporating capacity.

Many attempts have been made already so to regulate the evaporation of a solution, such as thin juice, that an evaporated solution (thick juice) of constant density is obtained. The first attempts were aimed at establishing the most favorable juice levels in the evaporating bodies with the help of the testing outcomes of Claassen and Kerr.

Subsequently, several manufactuers have tried to regulate the steam or vapor supply by keeping the vapor-pressure constant in the first, second or third body, for example in Stork's "Area" installation. The contemplated object to draw off thick juice of constant density from the last body was attained only partly.

The "Taylor Instrument Company," see "Sugar" by Camp below, is one of the first, that has realised a really fully automatic regulation of a multiple-effect evaporation in which the operation is based on regulating the thick-juice draining valve and on the automatic juice level regulation in all bodies, that finally affects the steam supply to the first body or the vapor flow in the suitable vapor connecting-pipe. This system however has the disadvantage, that the right operation is made conditional on a comparatively large number of governor cranks connected in series and on a concentration-meter, which reacts only slowly to the adjustment of the thick juice and steam valves, resulting in a slow action and a great chance of disturbances.

In "Sugar" (June 1950, page 26) an evaporation-regulation has been mentioned by A. C. Camp, in which the position of the steam valve before the steam drum of the first body is brought into line with the position of a hypsometer in the thin juice tank, before evaporation. According to the outline given, however, with equal position of the hypsometer, or the steam-valve, juice flow and steam supply are affected by the prevalent pressure in the juice space, or steam drum, of the first body and by the pressure of the heating steam. Moreover it starts from the connection between steam expenditure and thin juice flow (optimum steam-juice ratio), which is simple in a purely multiple effect evaporation, but can practically not be used in variably removing vapor and pre-connection of a "Pauly-body."

According to the invention, sugar juice is obtained for example by starting from the invariably simple relationship between thin juice quantity, that passes per time-unit, and the quantity of water to be evaporated per time-unit, to obtain thick juice of desired density from a variable thin juice flow of variable density. If the quantity of thin juice per second is $Gdns$, with a density $bdns$, and if thick juice is desired with a density $bdks$ percent brix, the following formula will hold good, when the quantity of thick juice obtained per second is $Gdks$:

$$Gdks = \frac{(bdns \times Gdns)}{bdks}$$

The quantity of water to be evaporated per second $= W$, then comes to:

$$W = Gdns - Gdks$$
$$= Gdns - \frac{bdns \times Gdns}{bdks}$$
$$W = \frac{Gdns(bdks - bdns)}{bdks}$$

so that $$\frac{bdks}{(bdks - bdns)} = \frac{Gdns}{W} = k$$

If the desired $bdks$ (brix thick juice) is predetermined, the ratio $k$ between $Gdns$ and $W$ is known for each value of $bdns$. In practice $bdks$ is predetermined between 60 and 70, average 65% brix. The $bdns$ (brix thin juice) varies between 13 and 17% brix, average 15% brix.

The following table gives values of the factor $$k = Gdns/W$$

or the ratio of the weight rate of flow of thin juice per second to the weight of water evaporated per second:

k Values

| bdns | bdks | | |
|---|---|---|---|
| | 60% | 65% | 70% |
| 13% | 1,277 | 1,250 | 1,228 |
| 15% | 1,333 | 1,300 | 1,272 |
| 17% | 1,395 | 1,354 | 1,321 |

According to the invention every moment the quantity of thin juice (solution) and the brix of it, that flows per time-unit to the evaporator, is measured, together with the quantity of evaporated water (condensate), in order so to regulate the supply of steam with a prescribed brix of thick juice, the desired ratio $k$ is realised. The adjustment of the steam supply can be done: (1) by manual adjustment; (2) automatically, by means of a flow-ratio-controller of known manufacture, whereby the ratio-value can be corrected or not by the indication of a thin-juice-brix-meter.

The evaporation is directed in such a way, that, independent of the vacuum or the state of sedimentation on the heating-surfaces etc., the desired degree of density is guaranteed beforehand. If for example the sedimentation on the evaporating bodies causes less water to be evaporated, this will be noticeable in the measured quantity of evaporated solvent (condensate) per time-unit. Through this, a deviation would arise with respect to the adjusted coefficient $k$. Such deviation is prevented, because the steam-valve is opened more by means of the flow-ratio-controller. The measurement of the quantity of thin juice, which flows to the evaporator per time-unit, and also the brix of it, can be done according to one of the known and approved measuring methods.

The present invention is aimed at a practical method of measurement of the quantity of condensate including the measurement of steam or vapor. In this case meters are applied in all vapor pipes. In a pure multiple effect evaporation, without bleeding vapor from the system, the condensate of the second body can be taken as a standard and is equal to the total vapor release in that body. If the evaporation is $p$-fold, it may be supposed approximately, that the quantity of evaporated water $= p$ times quantity of condensate of the second body. If a ratio-regulator is chosen for the ratio "$a$" of the quantity of thin juice to the condensate of the second body, then "$a$" must be $p$ times $k$. It is not necessary for the measurement to use the full quantity of condensate of a body, but it will do to branch off e. g. 10% or 5% of it. In this case a measuring flange or a measuring partition with 10 equal openings can be placed in the pipe and the liquid from one or more openings is conducted into a separate space which is framed for the measurement of condensate.

In a multiple-evaporation with removal of vapor and with a pre-heater, all condensed vapor should be caught and measured. It is desirable to measure the vapor from the last body of the evaporator to the direct contact condenser C; a measuring-flange in the big vapor-pipe 17 is less suitable, although in principle possible. Also it is in principle possible, to measure the condensate in each spot separately and to transfer all values to an adding meter. However, it is simpler for technical convenience of measuring to apply an approximative method.

First thin juice is preheated in a preheater H to the same temperature as the juice in the pre-evaporator P or in the first body I of the evaporator. In such a case it can be supposed approximately for the pre-evaporator P and for the bodies I to V of the multiple-effect-system, that 1 kilogram of vapor arises from 1 kilogram of condensed heating-steam (or vapor).

In the accompanying drawing an evaporating-outline is given schematically by way of example.

1 represents an indicating or registering flow rate meter for the quantity of thin juice, that flows to the evaporator per time-unit; 2 a thin juice density flow rate meter; 3 a condensate meter; 4 a thin juice thermo-impulse donor; 5 a pressure-impulse donor; 6 a thick juice density meter; 7 are condensate pumps; 8 the thin juice valve; 9 the steam valve of the preheater; 10 the condensate outlet pipe; 11 are stop-valves in the liquid-carrying pipes between the bodies; 12 is a vapor pipe of the pre-evaporator; 13, 14, 15 and 16 are vapor pipes between the bodies; the meters M are vapor meters; 17 is the vapor pipe to the contact condenser C; 18 is the thick juice pipe and 19 are the air-lines of the automatic, known, regulating apparatus A (e. g. Taylor Instrument Company) that regulates the steam valves $R_2$—$S_2$ and if necessary the thin juice valve 8; 20 are the measuring-pipes and 21 the air supply pipe to the ratio regulating apparatus A. The dashed line indicates the juice flow and the chain lines are vapor pipes. Solid lines indicate condensate pipes and dotted lines indicate control-impulse lines. Further H is a preheater, P is a pre-evaporator and I, II, III, IV and V are the bodies of a multiple effect evaporator. S is a waste steam valve to the liquid heater H. $S_1$ is a fresh steam valve to the pre-evaporator P. $S_2$ is a fresh steam valve to the first evaporator-evaporator body I. $R_1$ is a waste steam valve to the pre-evaporator body P. $R_2$ is a waste steam valve to the first evaporator body I.

To distinguish the various vapor movements in the evaporator systems to which the invention pertains the following terminology has been adopted:

"Vapor bled" means the vapor removed from the evaporator system as identified at $d$ in the drawing.

"Vapor transferred" means the vapor transported from one evaporator body in a multiple evaporator system to the next evaporator body as identified at D in the drawing.

"Vapor release" means the total vapor removed from any evaporator body as identified at $d+D$ in the drawing.

If the vapor bled per second from some evaporator body is $d$, the weight quantity of the vapor per second or vapor transferred from that body to the next evaporator body is D, and the condensate per second in the steambelt or calandria of the first mentioned evaporator is $c$, then we may put as a rough approximation that the weights of all vapors released per second is equal to the weight of condensed steam (condensate) per second, remembering, of course, that the condensate formed in the calandria is approximately equal to the total vapor released in the body.

Now the weight of all vapor released per second is $d+D$, the weight of the condensate obtained per second is $c$, thus $d+D=c$. This rule is valid for the first, the second and all following evaporator bodies; thus we have:

$$d_1+D_1=c_1$$
$$d_2+D_2=c_2$$
$$\ldots\ldots$$
$$d_j+D_j=c_j$$

If there are "$n$" evaporator bodies, we have for the last body $$d_n+D_n=c_n$$

There is generally no vapor bled from the last body and all vapor is led or transferred to the condenser, so we have:

$$d_n=0, \text{ and } D_n=c_n$$

From the pre-evaporator P only vapor for heating of juices or for boiling in vacuum pans is removed; there is no vapor passing from it to the first evaporator body. So we have only $d_p$, but $D_p=0$. Thus we have: $d_p=c_p$.

The weight quantity of water (solvent) to be evaporated per second "W" is:

$$W=d_p+(d_1+D_1)+(d_2+D_2)+\ldots D_n$$
$$=d_p+\text{sum }d+\text{sum }D$$

We have obtained:

$$d_p=c_p$$
$$d_1+D_1=c_1$$
$$d_2+D_2=c_2$$
$$\ldots\ldots$$
$$d_j+D_j=c_j$$
$$\ldots\ldots$$
$$D_n=c_n$$

$$\overline{W=d_p+\text{sum }d+\text{sum }D=c_p+\text{sum }c}$$

This being the simplest method, according to the invention, the condensate of the pre-evaporator and the condensates of the multiple-effect, or proportional parts of it are joined, and the sum is substituted for the quantity of evaporated water, which must be in the given ratio to the quantity of thin juice per time-unit.

When the fluctuations in the thin juice flow and the thin juice density are not too large, the steam supply valve $R_2$ to the steam drum of the evaporator body I can be adjusted by hand, so that the desired ratio of the quantity of thin juice per time unit to evaporated solvent (water) rises or is maintained. A practical solution is then to indicate total quantity of vapor released per unit time by means of meters $m$ or the quantity of condensate, using the desired ratio directly on the graduated scale in the conformable quantity of thin juice. When the graduation is indicated as a band, the influence of the thin juice density on the ratio can be expressed. By applying e. g. three bands, it will be possible to adjust on a thick juice density of 60, 65 or 70 brix.

In case of more frequent fluctuations or when a technically better result is desired, the values of measurement of the quantities of thin juice and condensate are used as an impulse for a ratio regulating apparatus of known manufacture (A), which may also be provided with an automatic device, for regulating the given ratio dependent on the thin juice density; this regulating apparatus establishes the desired ratio by adjusting the steam supply valve $R_2$ to the first body of the evaporator. According to the invention this valve is manufactured in such a manner, that after fully opening the low pressure valve $R_2$, automatically a second high-pressure-valve $S_2$ is opened; in the highest position of the combined valve a light-, sound-, or other sort of signal is given, as a sign that the limit of the evaporating-capacity has been reached or surpassed. If necessary this signal can automatically reduce or fully close the thin juice flow at the same time.

If desired, the indication given by thin juice density meter 2 can be used to correct automatically the given ratio by correcting the ratio regulator in regard to the fluctuating thin juice density. The adjustment to the desired thick-juice-density is done by hand.

In practice the thin juice pre-heater H is operated automatically by a temperature regulator 4 and the pre-evaporator or Pauly-body by a pressure-regulator 5, while the most favorable juice level in the bodies is adjusted by hand or by one of the known level regulators.

When for the desired thick juice density the evaporating capacity is surpassed, throttling of the thin juice flow can be discontinued by adjusting to a lower thick juice density.

The device according to this invention consists in the application of different meters in the manufacture:

First, meter 1 for measuring the quantity of passing solution (thin or dilute juice) to the evaporator per time-unit, or a predetermined fraction of it.

Secondly, meter 2 for determining the thin juice density.

Thirdly, meter 3 for measuring the obtained total condensate from pre-evaporator and evaporating bodies, or a predetermined fraction of it, per time-unit.

In case the condensates from the pre-evaporator and from the evaporator bodies are not measured, but the quantities of vapor released per time-unit from the above mentioned bodies are measured $(d+D)$, including the vapor from the last evaporator body V to the condenser C, the necessary flow rate meters in the respective vapor lines are installed.

In a pure multiple evaporation, without pre-evaporator, i. e. without vapor bleeding, the measuring of the quantity of condensate per time unit from one evaporator body is sufficient as a simplification.

The flow-rate-meters in question may or may not be connected to a flow-ratio-controller, depending upon whether hand operation, semi-automatic operation or fully automatic operation is desired.

Flow-ratio-controller A regulates the quantity of steam per time unit through steam valve $R_2$ to the evaporator body I, in such a manner that the pre-determined ratio between the flow rate of dilute or thin juice and the flow rate of condensate is maintained at any moment, thus assuring that the thick or concentrated juice leaves the last evaporator body with the prescribed density (percent brix). If the flow rate of thin juice increases, flow-ratio-controller A automatically opens steam valve $R_2$; if the flow rate of thin juice decreases, flow-ratio-controller A automatically closes steam valve $R_2$.

If the flow rate of thin juice is too great with respect to the evaporating capacity of the evaporating equipment, flow-ratio-controller A keeps steam valve $R_2$ in its most open position, but nevertheless the ratio between the flow rate of thin juice and the flow rate of condensate will be too high. The density of thick juice will drop below the prescribed value and the evaporator equipment will be overloaded. Overloading occurs if the flow rate of thin juice is far too high, or if the evaporating capacity has decreased on account of scaling of the heating surfaces. If, in case of overload we want to maintain the prescribed density of thick juice, the flow rate of thin juice must be reduced. For this purpose, thin juice valve 8 is connected by airline 19 to the steam valve-combination $S_2$ and $R_2$. Thin juice valve is throttled so long as valve $R_2$ is in its highest position and thin juice flow rate is so much reduced that the ratio between thin juice flow rate and condensation flow rate is restored to the predetermined value. The automatic adjustment of steam valve $R_2$ by flow-ratio-controller A is restored, but at a reduced feed of thin juice.

In the special case where only one body takes care of the evaporation, it is clear that only the steam supply to this body is regulated according to the flow rate of thin juice to this body. In the case of a simple effect evaporator, containing only one body, the automatic regulator A regulates the supply of steam to this body, still by means of steam valve $R_2$.

What we claim is:

1. The method of obtaining a concentrated liquid solution of constant predetermined density from dilute stock, which comprises supplying a regulated amount of evaporating heat to the dilute stock in a multiple evaporator system having a plurality of evaporator bodies without a preheater to remove solvent therefrom, automatically recording both the quantity of dilute stock treated per unit of time and the total quantity of vapor released from one of said evaporator bodies per unit of time in order to maintain a predetermined ratio between said measured quantities, and automatically increasing said regulated amount of heat in accordance with increases in said predetermined ratio to compensate for said increases and decreasing said regulated amount of heat to compensate for decreases in said ratio.

2. The method of obtaining a concentrated liquid solution of constant predetermined density from dilute stock, which comprises supplying to the dilute stock a regulated amount of evaporating heat per unit of time to remove solvent therefrom, the heat being in an amount to maintain a predetermined ratio between the quantity of dilute stock treated per unit of time and the total quantity of vapor released per unit of time, and increasing said regulated amount of heat in accordance with increases in said predetermined ratio to compensate for said increases and decreasing said regulated amount of heat to compensate for decreases in said ratio.

3. The method of obtaining a concentrated liquid solution of constant predetermined density from dilute stock, which comprises supplying evaporating heat to the dilute stock in a multiple evaporator having a plurality of evaporator bodies to remove solvent therefrom, the heat being in an amount to maintain a predetermined ratio between the quantity of dilute stock treated per unit of time and the total quantity of vapor released per unit of time, automatically recording both the quantity of dilute stock treated per unit of time and the total quantity of vapor released from all the evaporator bodies per unit of time, and automatically increasing said regulated amount of heat in accordance with increases in said predetermined ratio to compensate for said increases and decreasing said regulated amount of heat to compensate for decreases in said ratio.

4. The method of obtaining a concentrated liquid solution of constant predetermined density from dilute stock, which comprises supplying evaporating heat to the dilute stock to remove solvent therefrom, the heat being in an amount to maintain a predetermined ratio between the quantity of dilute stock treated per unit of time and the total quantity of vapor released per unit of time, separating a predetermined fraction from the total quantity of dilute stock treated per unit of time, recording the quantity of said predetermined fraction, separating a similar fraction from the total quantity of vapor released per unit of time, recording the quantity of said similar fraction, and automatically increasing said regulated amount of heat in accordance with increases in said predetermined ratio to compensate for said increases and decreasing said regulated amount of heat to compensate for decreases in said ratio.

5. The method of claim 4 which comprises decreasing the quantity of said dilute stock treated per unit of time to compensate for losses in heat transmission caused by scaling and fouling of the heated surfaces.

References Cited in the file of this patent

UNITED STATES PATENTS

| | | |
|---|---|---|
| 559,857 | Lillie | May 12, 1896 |
| 1,041,725 | Baumann | Oct. 22, 1912 |
| 1,148,506 | Ellis | Aug. 3, 1915 |
| 1,766,622 | Frey | June 24, 1930 |
| 1,838,671 | Grove | Dec. 29, 1931 |
| 1,970,613 | McDill | Aug. 21, 1934 |
| 2,576,496 | Ziegler | Nov. 27, 1951 |
| 2,598,345 | Brown | May 27, 1952 |

FOREIGN PATENTS

| | | |
|---|---|---|
| 702,171 | Germany | Jan. 31, 1941 |